United States Patent [19]

Gifford et al.

[11] 4,273,815
[45] Jun. 16, 1981

[54] LAMINATED FILM PACKAGES

[75] Inventors: Maurice J. Gifford; Oscar E. Seiferth; Paul E. Grindrod, all of Madison, Wis.

[73] Assignee: Oscar Mayer & Co. Inc., Madison, Wis.

[21] Appl. No.: 235,291

[22] Filed: Mar. 16, 1972

Related U.S. Application Data

[60] Division of Ser. No. 48,929, Jun. 19, 1970, Pat. No. 3,698,979, which is a continuation of Ser. No. 612,964, Jan. 31, 1967, abandoned.

[51] Int. Cl.³ .................. B32B 27/08; B32B 27/10
[52] U.S. Cl. ..................................... 428/35; 229/80; 426/106; 428/514; 428/520; 428/522
[58] Field of Search ............... 161/247, 252; 99/169, 99/171 R, 171 S, 171 P; 229/66; 428/35, 514, 520, 522; 426/106, 811

[56] References Cited

U.S. PATENT DOCUMENTS

| 3,083,106 | 3/1963 | Sloan | 99/171 R |
| 3,137,580 | 6/1964 | Sloan | 99/171 LP |
| 3,560,227 | 2/1971 | Eichhorn | 161/252 |
| 3,647,485 | 3/1972 | Seiferth | 99/171 LP |

Primary Examiner—Marion McCamish
Attorney, Agent, or Firm—Lockwood, Dewey, Alex & Cummings

[57] ABSTRACT

A laminated film for packaging use which film has at least one lamina of a crystalline flexible polyvinylidene chloride film adhered to a lamina of chlorinated polyethylene film, the chlorinated polyethylene film having a chlorine of concentration of up to approximately 60%, by weight, with the particular chlorine concentration of from 30% to 50%, by weight, being preferred. The laminated film being formed by contacting a polyvinylidene chloride film while in a supercooled noncrystalline state with a chlorinated ethylene film and thereafter effecting crystallization of the polyvinylidene chloride film with substantially random crystal distribution throughout, such as, by heating the thus formed laminate to the crystallization temperature of the polyvinylidene chloride.

8 Claims, 13 Drawing Figures

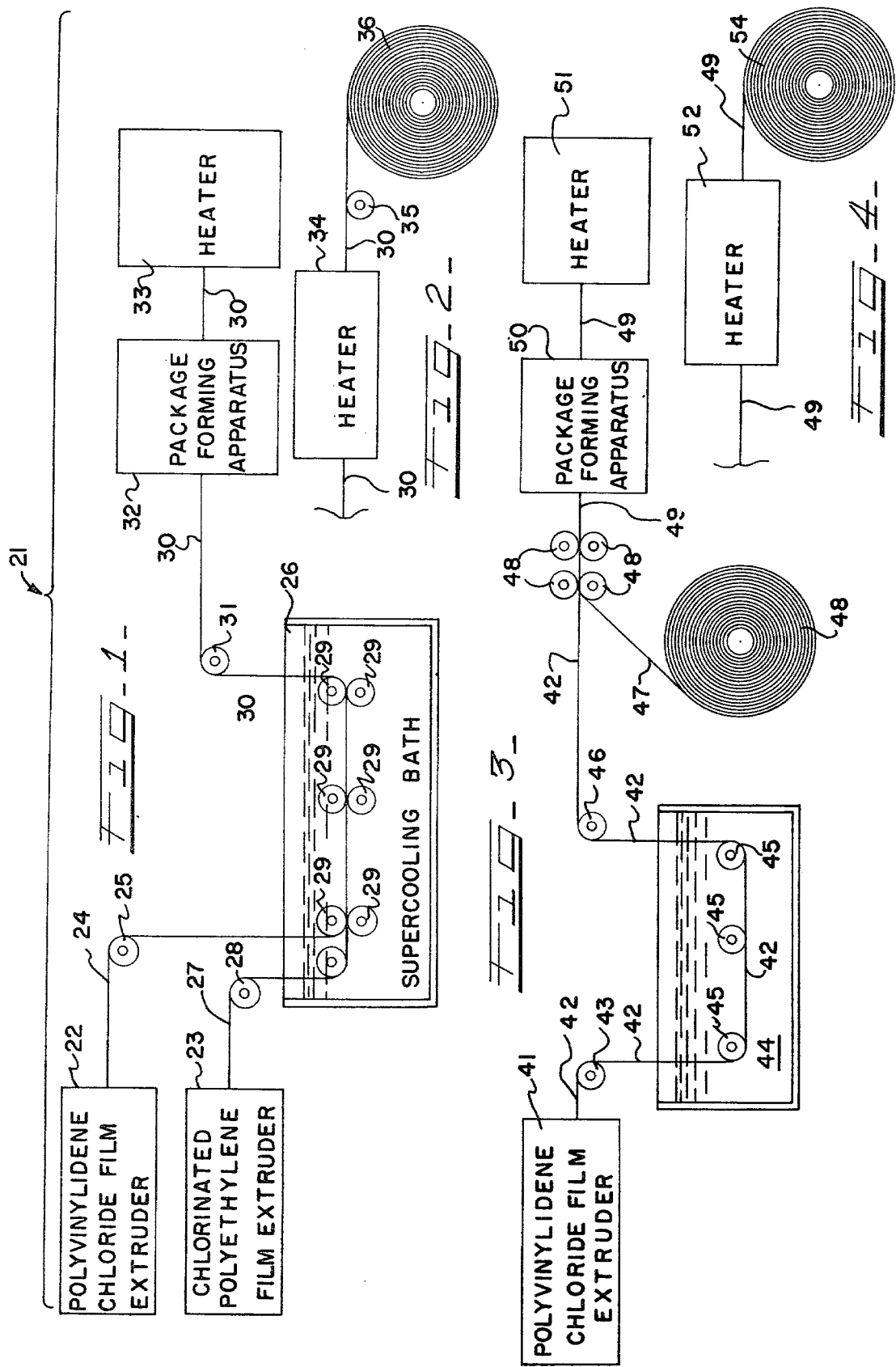

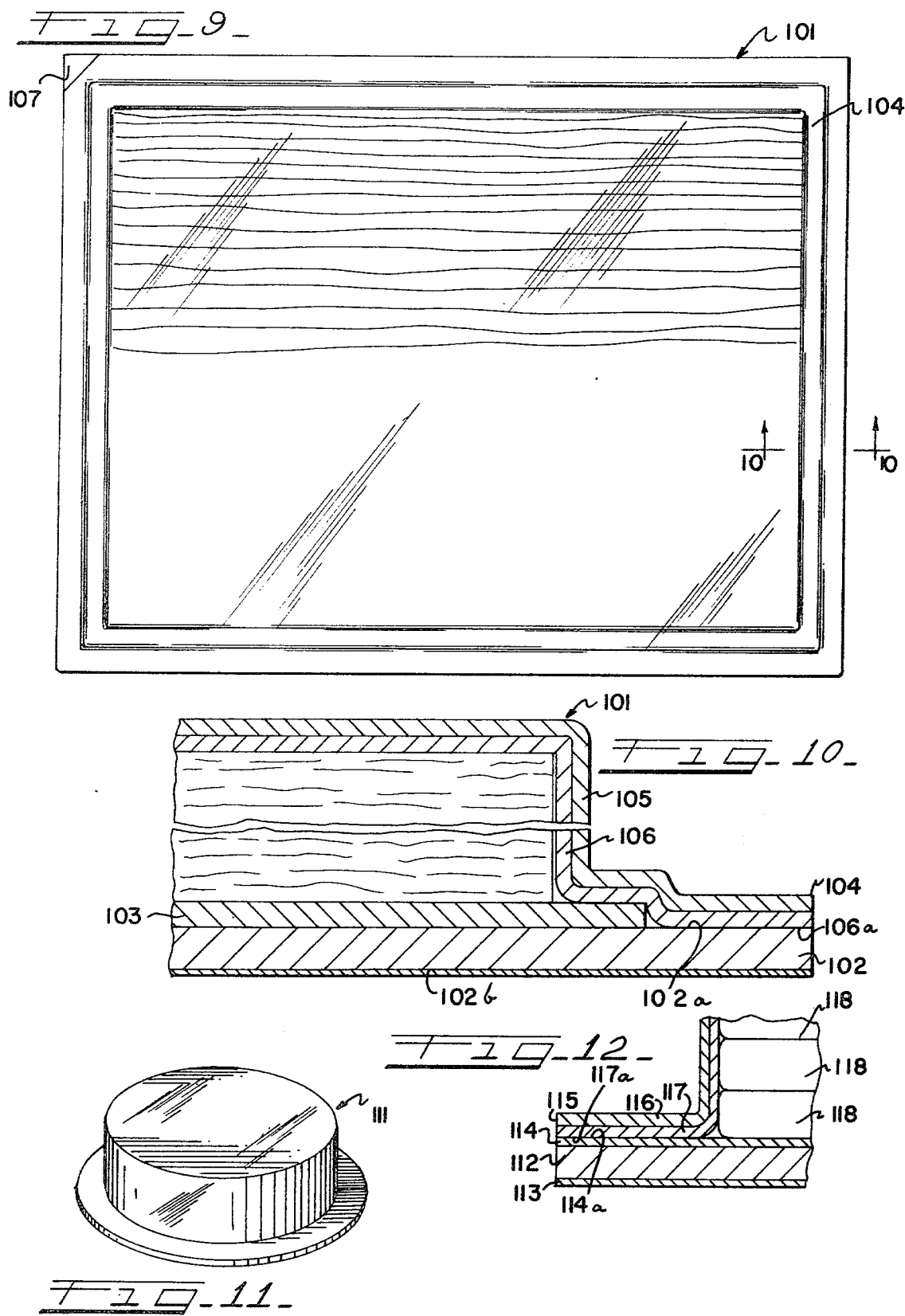

LAMINATED FILM PACKAGES

This application is a division of application Ser. No. 48,929, filed June 19, 1970 now U.S. Pat. No. 3,698,979, which was a continuation of U.S. application Ser. No. 612,964, filed Jan. 31, 1967 and now abandoned.

BACKGROUND AND DESCRIPTION OF INVENTION

The present invention relates to an improved laminated film having at least one lamina of polyvinylidene chloride film adhered to at least one lamina of chlorinated polyethylene, to the method of forming this improved laminated film, and to packages produced therewith.

Polyvinylidene chloride films, commonly known as Saran, are used extensively in the packaging of food products and the like which are susceptible to deterioration by oxygen and other gases. This film is adequately flexible and effectively impermeable to air and oxygen. In addition, polyvinylidene chloride films exhibit very unique properties in a so-called "supercooled" or amorphous condition during which these films can be readily formed around a product to be packaged without incurring undesirable folds, pleats or the like. For example, in following standard packaging procedures, this film upon being extruded is immediately cooled by advancing the same through a water bath maintained at a temperature of approximately 60° to 100° F. which brings about an amorphous condition in the film that is maintained until the combination of time and temperature conditions causes crystallization. While the film is maintained in its supercooled state without any substantial crystallization occurring, it can be sealed to itself merely by contact and without the application of heat. Thus the film is capable of forming a hermetic seal without substantial pressure and without the application of heat seal techniques.

Generally speaking, the polyvinylidene chloride film in its final crystallized form following the general procedure set forth above exhibits substantially random crystal distribution throughout providing that no substantial stretching of the film occurs during package formation. In this regard, however, it has been found that substantial stretching of the supercooled film tends to induce crystallization thereof even though the film is maintained at supercooled temperatures, the crystallization tending toward patterns of crystal orientation and resulting in a reducing or elimination of the self-sealing or fusing property.

The use of polyvinylidene chloride films in combination with other films, such as, for example, polyvinyl chloride, is well known as is shown in U.S. Pat. Nos. 3,083,106, 3,131,069 and 3,228,168. In this regard, however, it has been found that in using such laminated constructions, it is preferred that a plasticizer or pressure sensitive adhesive be used to obtain the desired hermetic seal between the respective laminated films of a package. For example, in U.S. Pat. No. 3,228,168, the use of a pressure sensitive adhesive in a package formed of a supercooled polyvinylidene chloride film to obtain a peelable and reclosable seal is described.

In accordance with an important aspect of the present invention, it has been found that a peelable seal can be obtained with a polyvinylidene chloride-chlorinated ethylene laminated film in which the chlorine concentration of the chlorinated ethylene lamina is maintained below 60% by weight. Accordingly, an important aspect of the present invention concerns the use of a unique laminated film material for packaging use which film mterial provides a peelable and reclosable seal with rigid polyvinyl chloride, polyvinylidene chloride, nylon, paper, cardboard, polyolefins and like packaging materials.

It has also been found that the novel laminated films of the present invention provide improved low temperature properties which advantageously provide increased flexibility and thereby effectively resist the formation of cracks or openings that not only destroy hermetic conditions but also enable the introduction of bacteria and other contaminants into packages produced therewith. This latter feature is particularly important in food packages which are commonly stored at temperatures of around 0° F. and below at which many conventional laminated films lose most of their flexibility.

It is, therefore, an important object of the present invention to provide an improved laminated film which is particularly suitable for packaging use which laminated film includes at least one lamina of crystallized polyvinylidene chloride which is adhered to a lamina of a non-crystalline or amorphous chlorinated polyethylene film.

Another object of the present invention is to provide a new and improved laminated film material which includes a lamina of flexible polyvinylidene chloride to which at least one lamina of chlorinated polyethylene is firmly bonded.

Another object of the present invention is to provide a new and improved laminated film material which includes a polyvinylidene chloride film and chlorinated polyethylene film which laminated film exhibits unique peelable and reseal characteristics with itself and other packaging materials without the use of a plasticizer adhesive interface or pressure sensitive adhesive.

Another object of the present invention is to provide a new and improved laminated material which exhibits excellent oxygen barrier properties and improved flexibility at low temperatures such as are commonly encountered in the storage of packaged food products.

Another object of the present invention is to provide a method for making a laminated packaging film having at least one lamina of polyvinylidene chloride adhered to a lamina of chlorinated polyethylene which method involves contacting a polyvinylidene chloride film, while in a supercooled state, with a chlorinated polyethylene film so as to effect intimate bonding thereof between the engaging surfaces to provide a laminated film which exhibits the unitary character and general appearance of a single layer film.

Another object of the present invention is to provide a new and improved package having a unique laminated film material which includes at least one lamina of a flexible polyvinylidene chloride film which is adhered to at least one lamina of a chlorinated polyethylene film.

Another object of the present invention is to provide a new and improved package which encloses a product between upper and lower sheets of packaging material, which sheets of packaging material are joined together without any interface of a pressure sensitive adhesive or plasticizer therebetween, wherein the engaging sheets can be readily separated without destruction to either of said sheets to provide access to said product and can be further selectively recombined by merely applying slight pressure thereto to provide a reclosable and hermetic seal for said package.

Other objects and advantages of this invention will be apparent from the following detailed description taken in conjunction with the accompanying drawings wherein:

FIG. 1 is a diagrammatic illustration of a procedure which can be followed in the formation of a laminated film embodying the present invention which film, upon its formation, is immediately formed into a product enclosing package;

FIG. 2 is a fragmentary diagrammatic illustration of a modification of the procedure shown in FIG. 1 wherein the film laminate, upon being formed, is received by a collecting roll on which it can be stored for subsequent packaging use;

FIG. 3 is a diagrammatic illustration of another modified procedure wherein a polyvinylidene chloride film upon being extruded is laminated with a preformed chlorinated polyethylene film continuously fed from a supply roll which film laminate is then immediately formed into a suitable product encompassing package;

FIG. 4 is a fragmentary diagrammatic illustration of a modification of the procedure shown in FIG. 3 wherein the laminate film upon being formed is received by a collecting roll on which it can be stored for subsequent packaging use;

FIG. 9 is a schematic plan view of another package embodying principles of the present invention;

FIG. 10 is a fragmentary section of the package shown in FIG. 9 taken along the line 10—10;

FIG. 11 is a perspective view of yet another package embodying principles of the present invention;

FIG. 12 is a fragmentary enlarged sectional view of a portion of the package shown in FIG. 11.

Figure 5:
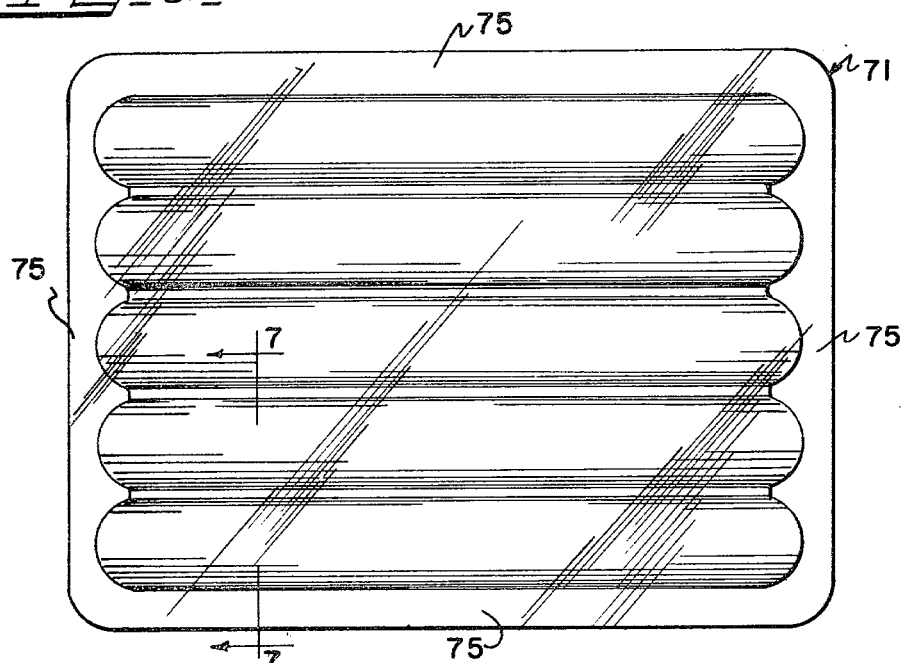
FIG. 5 is a schematic plan view of one form of wiener type product package embodying principles of the present invention.

In accordance with the present invention a novel film laminate is provided which employs at least one lamina of a crystallized polyvinylidene chloride film which is adhered to at least one lamina of a chlorinated polyethylene film. It should be noted that the term "laminate" is used to describe a composite sheet material which is formed from two or more separate films which have been bonded or adhered together to an extent that the resultant material acquires the integral unitary character and general appearance of a single layer of film.

The novel film laminates of the present invention can be used in a number of important areas among which include the packaging of food products such as, wieners, bacon, sliced luncheon meats and the like. Such packages exhibit excellent oxygen and air impermeability so as to enable the prolonged storage of these food products without incurring deterioration thereof caused by the permeation of air or other contaminants through the film. The film packages of the present invention also exhibit improved low temperature properties. For example, food packages formed of such products can be stored at temperatures of around 0° F. and below without loss of their flexibility, thereby effectively resisting the formation of cracks or openings therein which could act to destroy hermetic sealing conditions and enable the introduction of bacteria and other contaminants into contact with the thus packaged food product.

Another important aspect of the present invention concerns the control of the sealing properties of the film laminate with similar and non-similar substrate materials. In particular, it has been found that by regulating the chlorine content of the chlorinated polyethylene film, that the bond formed between this material and other materials such as for example, polyvinyl chloride, polyvinylidene chloride, nylon, paper, cardboard, polyolefins and the like can be varied and controlled to the extent that a peelable and reclosable seal can be formed therebetween without the use of an adhesive.

Another advantageous result obtained with the practice of the present invention concerns the obtaining of improved elongated properties with polyvinylidene chloride. As such, the polyvinylidene chloride-chlorinated polyethylene laminate films of the present invention exhibit an increased degree of stretchability which materially adds to the efficiency and versatility of such packaging films. This particular aspect of the invention is of importance to the food industry where food products such as for example, wieners are packaged on automatic apparatus which utilizes a series of moving cavity-type packaging dies into which the films are drawn and the product received, the package being automatically evacuated and simultaneously sealed. With such apparatus, one of the primary goals is that of forming a tight flexible film package of an oxygen impermeable laminated film wherein the laminated film engages the product for the purpose of not only establishing a generally rigid package which can be easily handled but also to provide a relatively tight film which resists rupture as a result of substantial flexing thereof. As such, the improved laminate films of the present invention exhibit a greater degree of elongation and thereby provide an improved margin of safety during operation of such automatic packaging apparatus.

The chlorinated polyethylene lamina in the laminate film of the present invention can be formed from polyethylene resins which have been chlorinated in accordance with well known techniques. As such, these materials have a varying degree of hardness and elasticity. These properties of chlorinated polyethylene films are determined and controlled by the nature of the polyethylene employed in the chlorination, the percent chlorine added to the polymer and the amount of residual crystallinity. While not normally required, suitable plasticizers can be incorporated into a polyethylene formulation to provide a chlorinated polyethylene film lamina which is less subject to embrittlement. The chlorinated polyethylene films of the present invention generally include those having a chlorine weight concentration of not more than approximately 60% since increasing the amount of chlorine results in increased adhesion between the chlorinated polyethylene and the other films which resists the formation of a peelable and/or reclosable seal. In this regard, it is preferred that the chlorine content of the chlorinated polyethylene film range from approximately 30% to 50%.

Referring to the drawings and with particular reference to FIG. 1, the numeral 21 generally designates one aspect of the method of the present invention wherein a polyvinylidene chloride film extruder 22 operates simultaneously with a chlorinated polyethylene film extruder 23. As is shown, the polyvinylidene chloride film extruder 22 supplies a continuous polyvinylidene chloride film 24 which passes around a suitable guide roll 25 into a supercooling bath 26 which can be a water bath maintained with a temperature range of from about 35° to 100° F. Simultaneously, the chlorinated polyethylene film extruder 23 continuously supplies a chlorinated polyethylene film 27 which passes around a suitable guide roll 28 into the supercooling bath 26 wherein the polyvinylidene chloride and chlorinated polyethylene films are contacted with each other between a plurality of laminating rollers 29. In the illustrated embodiment, a laminate 30 is thus formed in the supercooled bath 26 while the unique supercooled properties of the polyvinylidene chloride film are in effect thereby providing for complete adherence and bonding between the polyvinylidene chloride and chlorinated polyethylene films. The resulting laminate 30 passes from the bath 26 around a guide roller 31 into a suitable package forming apparatus schematically designated by the reference numeral 32. Such packaging apparatus acts in accordance with known techniques for handling supercooled polyvinylidene chloride films in order to provide product conforming packages therewith. A complete description of such apparatus is set forth in U.S. Pat. Nos. 3,083,106 and 3,129,545 and is incorporated herein by reference. Upon being discharged from the package forming apparatus 32, the thus formed package is heated by a suitable heater 33 so as to effect crystallization in the polyvinylidene chloride film. By way of example, the temperature of the polyvinylidene chloride lamina in the laminated package may be raised up to approximately 150° to effect the desired crystallization. If desired, crystallization can be obtained in the polyvinylidene chloride film by permitting the thus formed package to be stored at room temperature for a prolonged period of time. The package upon being so formed can then be transmitted to a suitable storage location or immediately shipped through normal product distribution channels.

In FIG. 2, an alternative arrangement for handling the laminate 30 is shown. In particular, the laminate 30, upon being discharged from the supercooling bath 26 is passed through a heater 34 for effecting the desired crystallization of the polyvinylidene chloride lamina whereupon the finished laminate 30 is then passed over a guide roller 35 and received by collecting roll 36 which, when filled, can be used as a supply roll for automatic packaging apparatus.

FIG. 3 generally illustrates a modified procedure for forming packages with the novel laminate film of the present invention. This procedure generally involves the use of a polyvinylidene chloride film extruder 41 which continuously supplies a polyvinylidene chloride film 42 over a guide roller 43 into a supercooling bath 44 comparable to supercooling bath 26 of FIG. 1. This film 42 is thereby immediately supercooled and guided through the bath 44 by a plurality of rollers 45. The supercooled film 42 passes out of bath 44 over a guide roller 46 and is then combined with a chlorinated polyethylene film 47 supplied from a supply roll 48. The respective films, 42 and 47, are firmly contacted with each other by a plurality of laminating rollers 48 and the resultant laminate 49 then passed through a package forming apparatus 50 comparable to that designated by the reference numeral 32 in FIG. 1. Crystallization of the polyvinylidene chloride film of the formed package is then set up by heating the packages with a heater 51. The finished packages can then be sent to suitable storage or dispensing areas.

In the modification partially illustrated in FIG. 4, the laminate 49 is discharged directly to a heater 52 and then onto a collector roller 54 which when filled can be used as a feed roll for automatic packaging apparatus.

Figure 6:
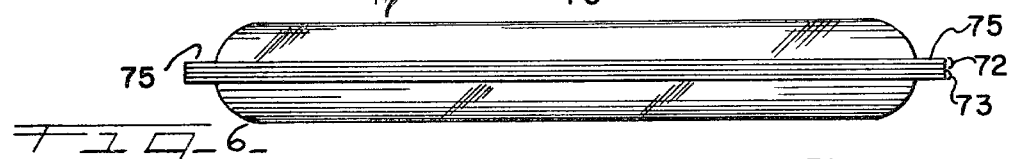
FIG. 6 is an elevational view of the package shown in FIG. 1.
Figure 7:
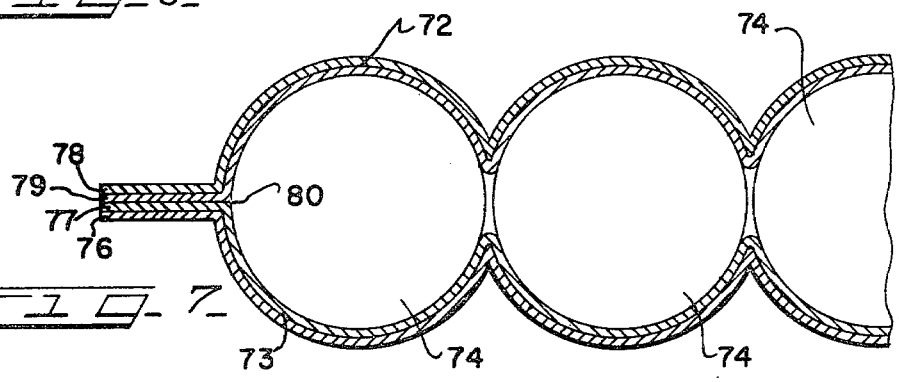
FIG. 7 is an enlarged fragmentary sectional view of the package of FIG. 5 taken along the line 7—7 therein and illustrating the novel film laminate construction of the present invention.

FIGS. 5-7 illustrate a package 71 formed of a top laminate 72 and bottom laminate 73 which cooperatively enclose therebetween a plurality of wieners or wiener-shaped products 74. The laminates 72 and 73 are combined peripherally about the products 74 to form a continuous edge seal 75. The laminates are also drawn inwardly about the products to conform to the contour thereof to provide the package 71 with improved rigidity for efficient handling.

As is best shown in FIG. 7, the bottom laminate 73 is formed of an outer lamina 76 of polyvinylidene chloride which is combined in adhering relationship with an inner lamina 77 of chlorinated polyethylene. The top laminate 72 is similarly formed with an outer polyvinylidene chloride film 78 and inner chlorinated polyethylene lamina 79. the polyvinylidene chloride film has generally crystalline structure with random crystal distribution throughout and provides suitable oxygen barrier properties. Typically, a polyvinylidene chloride film having a composition of approximately 85% vinylidene chloride and 15% vinyl chloride provides suitable oxygen barrier properties. A chlorinated polyethylene film exhibiting the desired flexibility and tack would have a chlorine composition of less than 60% by weight and preferably of from about 30% to 50% by weight.

In accordance with an important aspect of the present invention the seal area 75 between the chlorinated polyethylene laminae 77 and 79, generally designated by the numeral 80, can be readily separated by peeling back the top or bottom laminate, 72 or 73, to gain access to the package. Separation of these laminates, however, does not result in destruction to either of the laminates 72 or 73, nor does it produce a loss of adequate sealing properties so as to prevent effective resealing of the package. As such, the resealing characteristic of the present invention serves to prevent the further supply of oxygen bearing air to the thus enclosed product. In this regard, it will be appreciated, of course, that any quantity of air which may have become trapped by reason of opening of the package and further resealing thereof would be insufficient to materially affect the product. The peelable seal and reseal properties of these packages are particularly significant since they are obtained without using a plasticizer or pressure sensitive adhesive at the interface 80. While not shown, a suitable tab or similar device may be incorporated into the seal area to permit ready separation of the top and bottom laminates for access into the package.

Figure 8:
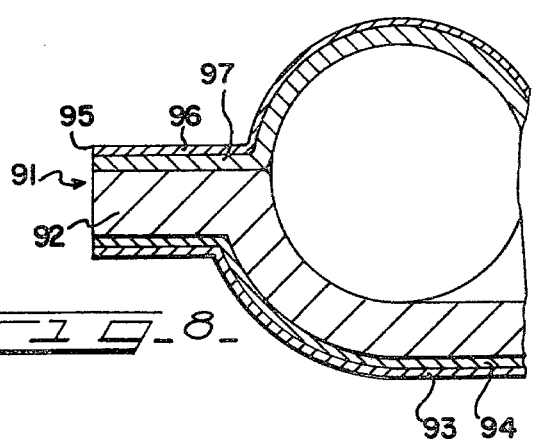
FIG. 8 is a view similar to FIG. 7 illustrating a modification of the package of FIG. 5.

In FIG. 8, a similar package 91 is partially shown. Package 91 is composed of a rigid base member 92 formed, for example, of a ten mil thick polyvinyl chloride sheet. Such vinyl sheets are generally referred to as calendered food-approved sheeting. since such film is generally permeable to oxygen bearing gases, a suitable oxygen barrier film may be bonded thereto. For example, in the illustrated embodiment, a polyvinylidene chloride film 93 is fixed to the rigid base member 92 by means of an intermediate layer of chlorinated polyethylene 94. If desired, however, a suitable adhesive or glue coating may be substituted as the interface between the rigid base member 92 and the polyvinylidene chloride sheet 93. The top laminate 95 is formed of an outer polyvinylidene chloride film 96 which is intimately bonded to a chlorinated polyethylene lamina 97. Typically, the polyvinylidene chloride film lamina 96 would have a thickness of about one mil while the chlorinated polyethylene film lamina 97 would have a thickness of from about one to two mils.

FIGS. 9 and 10 illustrate a package embodying principles of the present invention which is particularly suited for packaging bacon strips and similar elongated meat products. As is shown, the package 101 comprises a baseboard 102 upon which a product board 103 is mounted. The bacon product, usually in the form of a plurality of stacked elongated slices extends along the product board 103. A laminate cover member 104 which comprises an outer lamina 105 of polyvinylidene chloride adhered to an inner lamina 106 of chlorinated ethylene completely covers the product and extends downwardly along the edges thereof in intimate contact with the product board 103 and outer peripheral portions of the baseboard 102. A hermetic seal is formed between the inner surface 106a of the chlorinated ethylene lamina and the upper surface 102a of baseboard 102. In accordance with this invention, by controlling the degree of the chlorine concentration in the chlorinated ethylene film it is possible to effectively control the adhesion between the baseboard 102 and the chlorinated polyethylene lamina 106. The maximum chlorine concentration in the chlorinated ethylene lamina 106 is approximately 60% by weight with the weight range of 30% to 50% chlorine being particularly preferred.

As is best shown in FIG. 9, a corner portion of baseboard 102 is provided with a triangular insert 107 placed on top thereof and formed of material which is not adherent to the chlorinated ethylene film 106. In this manner, a portion of the film may be readily lifted and grasped for subsequent peeling of the film from the surface of the baseboard 102 in order to obtain access to the product.

The baseboard 102 of the package may be formed from any suitably relatively rigid material such as, for example, bleached kraft paperboard having a thickness of form about 0.01 to 0.020 of an inch. The bottom surface of the baseboard 102 is preferably provided with a coating which is water impermeable. For example, the bottom surface of baseboard 102 may be provided with a coating 102b of microcrystalline paraffin wax. While not specifically illustrated, the top surface of baseboard 102 may be similarly supplied with a suitable continuous oxygen bearing material such as, for example, aluminum foil. In this manner, the baseboard is sealed aganst oxygen leakage therethrough. The oxygen barrier material which could be in the form of aluminum foil or the like can be secured by an adhesive or glue to the baseboard. It is also possible to construct the baseboard of a rigid polyvinyl chloride material comparable to that shown in the package of FIG. 8. A laminate film embodying the present invention formed of an inner chlorinated ethylene lamina and outer polyvinylidene chloride lamina could be then fixed to the bottom surface thereof and used as an oxygen and moisture barrier. Product board 103 is received on the upper surface of baseboard 102 and may be formed from wax paper board having a thickness of from about 0.0015 to 0.007 of an inch.

In accordance with the present invention, the top laminate 104 includes the polyvinylidene chloride lamina 105 which in a supercooled state was adhered to the flexible chlorinated ethylene film in any of the manners described in conjunction with FIGS. 1-4. The formability of the packaging laminate 104 permits the ready conformation thereof to the configuration of the product, product board and baseboard when the film is drawn thereover during the package forming operation.

FIGS. 11 and 12 illustrate a modified package 111 which is particularly suited for the packaging of sliced luncheon meats such as, for example, bologna, salami, beef loaf, chopped ham loaf and the like.

As is best shown in FIG. 12, the package 111 includes a baseboard 112 formed, for example, from bleached kraft paperboard having a thickness of from about 0.012 to 0.020 of an inch. In the illustrated embodiment, the bottom surface of the baseboard 112 has applied thereto a suitable water impermeable coating such as for example, a wax coating 113. The top surface of the board similarly has applied thereto a suitable oxygen barrier material such as a sheet of aluminum foil 114 which is preferably fixed to the baseboard member 112 by means of a suitable adhesive. It will be apppreciated, of course, that baseboard 112 can be formed of materials which are inherently oxygen impermeable such as, for example, metal or the like and that in such instances the barrier materials such as the metal foil and paraffin can be thereby eliminated. Similarly, if desired, baseboard 112 can be formed of a suitable rigid polyvinyl chloride material comparable to that designated by the reference numeral 92 in FIG. 8 which has applied to the bottom surface thereof a laminate prepared in accordance with this invention, viz. one formed with an inner lamina of chlorinated polyethylene to which a polyvinylidene chloride lamina is adhered.

In the illustrated embodiment, cover member 115 is formed with an outer lamina of crystallized polyvinylidene chloride 116 which is adhered to a non-crystalline chlorinated polyethylene material 117 having a chlorine content of up to 60% by weight. As is shown, the laminated cover member 115 is drawn over the product slices 118 in conforming relationship therewith and extends around the peripheral portions of the baseboard member 112 with the inner surface 117a of the chlorinated polyethylene in adherent contact with the upper surface 114a of the oxygen barrier material 114. As was previously noted, by controlling the degree of substitution in the chlorinated polyethylene, it is possible to provide a peelable seal for the package 111 which can be selectively reclosed to provide hermetic sealing of the package following removal of a portion of the product. This unique feature of the present invention is particularly significant since the reclosable hermetic seal is obtained without the use of a pressure sensitive adhesive or the like.

Figure 13:
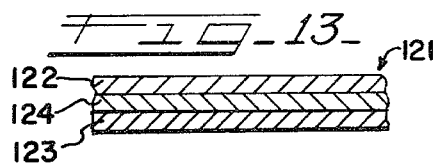
FIG. 13 is a fragmentary sectional view of a three-ply laminate film embodying the present invention.

FIG. 13 illustrates a three-ply laminated packaging film 121 made in accordance with the present invention. In particular, the laminated film 121 includes outer laminae 122 and 123 of polyvinylidene chloride which are adhered to an inner lamina 124 of chlorinated polyethylene. This particular laminated construction can be used in any of the above described package constructions as a replacement for the illustrated two-ply film. In particular, where pressure sensitive resealable properties are desired, it is preferred in using the laminated film of FIG. 13 to provide a pressure sensitive adhesive interface between the polyvinylidene chloride film portions which contact each other in the seal area through which access to a product is to be obtained. The use of a pressure sensitive adhesive in combination with the polyvinylidene chloride film is more fully described in U.S. Pat. No. 3,228,168. In this patent, various three-ply laminate constructions are shown which essentially employ polyvinylidene chloride layers or films with a polyvinyl chloride film sandwiched therebetween. The particular laminate construction of the present invention essentially substitutes the chlorinated polyethylene for the polyvinyl chloride material shown therein.

In accordance with this invention, the chlorinated polyethylene is laminated or adhered to the respective polyvinylidene chloride films while said polyvinylidene chloride films are in a supercooled or amorphous state. Further treatment, such as, for example, by heating the thus formed laminated to a temperature of around 150° results in crystallization of the polyvinylidene chloride film. It is not believed that the chlorinated polyethylene undergoes any substantial crystallization by such treatment and remains in a so-called amorphous or non-crystalline state throughout its use in the package product. Laminates of the type shown in FIG. 13 are particularly suitable for use in packaging food products since they exhibit improved flexibility at the low temperatures to which food products are normally subjected.

While various embodiments of packages and laminate films embodying the present invention have been described, it will be apparent that certain modifications and variations therefrom may be made without departing from the spirit and scope of this invention. Accordingly, only such limitations are to be imposed thereon as are indicated in the appended claims.

We claim:

1. A package comprising a product enclosed between first and second sheets of packaging material, said first and second sheets having respective first and second seal forming surfaces which are releasably adhered to each other without an adhesive layer therebetween to define a hermetic seal area which can be readily separated when access to said product is desired and being reclosable for effective resealing after access to said product has been obtained, at least said first sheet being a laminated film in which a polyvinylidene chloride film is adhered to a chlorinated polyethylene film having a chlorine content in the range of 30% to 60% by weight, said chlorinated polyethylene film being the seal forming surface of said sheet.

2. The package of claim 1 wherein said chlorinated polyethylene film has a chlorine content of from approximately 30% to 50% by weight.

3. The package of claim 2 wherein said second seal forming surface is formed of a polyvinylidene chloride film which is adhered to said chlorinated polyethylene film while said polyvinylidene chloride film is in an amorphous condition.

4. The package of claim 2 wherein said second seal forming surface is formed of a material selected from the group consisting of polyvinyl chloride, polyvinylidene chloride, nylon, paper, cardboard and the polyolefins.

5. The package of claim 2, wherein said polyvinylidene chloride film is adhered to said chlorinated polyethylene film while said polyvinylidene chloride film is in an amorphous condition.

6. The package of claim 1 wherein said second seal forming surface is formed of a polyvinylidene chloride film which is adhered to said chlorinated polyethylene film while said polyvinylidene chloride film is in an amorphous condition.

7. The package of claim 1 wherein said second seal forming surface is formed of a material selected from the group consisting of polyvinyl chloride, polyvinylidene chloride, nylon, paper cardboard and the polyolefins.

8. The package of claim 1, wherein said polyvinylidene chloride film is adhered to said chlorinated polyethylene film while said polyvinylidene chloride film is in an amorphous condition.